US012766920B2

(12) United States Patent
Zhang

(10) Patent No.: US 12,766,920 B2

(45) Date of Patent: Oct. 20, 2026

(54) THERMAL MANAGEMENT SYSTEM FOR A VEHICLE

(71) Applicant: Vitesco Technologies GmbH, Regensburg (DE)

(72) Inventor: Hong Zhang, Tegernheim (DE)

(73) Assignee: Vitesco Technologies GmbH, Regensburg (DE)

( * ) Notice: Subject to any disclaimer, the term of this patent is extended or adjusted under 35 U.S.C. 154(b) by 121 days.

(21) Appl. No.: 18/815,250

(22) Filed: Aug. 26, 2024

(65) Prior Publication Data

US 2024/0416721 A1 Dec. 19, 2024

Related U.S. Application Data

(63) Continuation of application No. PCT/EP2023/055181, filed on Mar. 1, 2023.

(30) Foreign Application Priority Data

Mar. 2, 2022 (DE) ..................... 10 2022 202 121.5

(51) Int. Cl.

*B60H 1/00* (2006.01)

*B60H 1/14* (2006.01)

(52) U.S. Cl.

CPC ..... *B60H 1/00885* (2013.01); *B60H 1/00278* (2013.01); *B60H 1/14* (2013.01); *B60H 1/00392* (2013.01)

(58) Field of Classification Search

CPC ............ B60H 1/00278; B60H 1/32284; B60H 1/00885; B60T 5/00

See application file for complete search history.

(56) References Cited

U.S. PATENT DOCUMENTS

2020/0047586 A1 2/2020 Gonze
2020/0361280 A1 11/2020 Hahimoto
2021/0094383 A1* 4/2021 Vader ................ B60H 1/00278
2022/0194165 A1* 6/2022 Cohan ..................... F16D 61/00

FOREIGN PATENT DOCUMENTS

DE 102019114581 A1 2/2020
DE 102020112798 A1 11/2020
EP 3689647 A1 8/2020

OTHER PUBLICATIONS

European Search Report dated Mar. 1, 2023 for corresponding European Patent Application No. PCT/EP2023/055181.
German Search Report dated Jun. 1, 20244 for corresponding German Patent Application No. 10 2022 202 121.5.

* cited by examiner

*Primary Examiner* — Eric S Ruppert

(57) ABSTRACT

A thermal management system for a vehicle has: a cooling medium circuit with a cooling medium pump for delivering a cooling medium in the cooling medium circuit for cooling a brake and/or a component of an electric drive motor of the vehicle and/or a transmission, a heating medium circuit with at least one heating medium pump for delivering a heating medium in the heating medium circuit for cooling and/or heating a battery and/or power electronics and/or a charging device and/or another component of the electric drive motor of the vehicle and/or an interior of the vehicle, and a heat transfer device for exchanging heat between the cooling medium in the cooling medium circuit and the heating medium in the heating medium circuit.

10 Claims, 2 Drawing Sheets

THERMAL MANAGEMENT SYSTEM FOR A VEHICLE

CROSS-REFERENCE TO RELATED APPLICATIONS

This application claims priority to PCT Application PCT/EP2023/055181, filed Mar. 1, 2023, which claims priority to German Patent Application No. DE 10 2022 202 121.5, filed Mar. 2, 2022. The disclosures of the above applications are incorporated herein by reference.

FIELD OF THE INVENTION

The present invention relates to a thermal management system for a vehicle, such as a motor vehicle, for instance an electric, hybrid or hydrogen vehicle.

BACKGROUND OF THE INVENTION

Such vehicles have an electric drive motor, a battery and power electronics, for instance an inverter. A thermal management system, which has one or more cooling circuits for cooling the electric drive motor, the battery and the power electronics, ensures that the operating temperatures of the electric drive motor, of the battery and of the power electronics lie within predefined temperature windows in order to prevent damage and/or power losses of the correspondingly cooled components.

SUMMARY OF THE INVENTION

It is an object of one embodiment of the present invention to provide an improved thermal management system for a vehicle.

This object is achieved by a thermal management system for a vehicle having the features described. Also described is a vehicle having such a thermal management system.

According to one aspect of the invention, a thermal management system for a vehicle such as a motor vehicle, which may be an electric, hybrid or hydrogen vehicle, has:

- a cooling medium circuit with a cooling medium pump for delivering a cooling medium, such as oil, in the cooling medium circuit for cooling a brake, such as a multiple-disk brake and/or a component, for instance a rotor, of an electric drive motor of the vehicle and/or a transmission, such as a reduction gearbox, of the vehicle, a heating medium circuit with at least one heating medium pump for delivering
- a heating medium, such as water, in the heating medium circuit for cooling and/or heating a battery and/or power electronics and/or a charging device and/or another component, for instance a stator, of the electric drive motor of the vehicle and/or an interior of the vehicle, such as by a heat exchanger, and
- a heat transfer device for exchanging heat between the cooling medium in the cooling medium circuit and the heating medium in the heating medium circuit.

In this way, in one embodiment, the heat absorbed or dissipated by the cooling medium from the brake and/or from the component of the electric drive motor and/or from the transmission is transferred through the heat transfer device to the heating medium and from the latter to the battery and/or into the interior of the vehicle. In one embodiment, therefore, a separate heating element, for instance a PTC heating element, which is typically installed in an air-conditioning system of the vehicle, for heating the interior, and/or a further separate heating element, for example likewise a PTC heating element, which is typically used to regulate the temperature of the battery, may be obviated.

According to one embodiment, the thermal management system further has at least one temperature recording unit, which is adapted to record an interior temperature of the interior of the vehicle and/or a battery temperature of the battery, at least one manifold valve, by which an amount of heating medium delivered to the battery and/or an amount of heating medium delivered to the power electronics and/or an amount of heating medium delivered to the charging device and/or an amount of heating medium delivered to the other component of the electric drive motor of the vehicle and/or an amount of heating medium delivered to the heat exchanger may be set, and a control unit, which is adapted to drive the at least one manifold valve in such a way that the heating medium is delivered to the battery when the battery temperature is less than a predefined battery temperature threshold value, and/or to drive the at least one manifold valve in such a way that the heating medium is delivered to the heat exchanger when the interior temperature is less than a predefined interior temperature threshold value.

In this way, in one embodiment, the battery is heated by using the heat transferred to the heating medium if the battery temperature lies below the (lower) battery temperature threshold value necessary for reliable operation of the battery. In addition or alternatively, in one embodiment, the interior of the vehicle may in this way be heated by using the heat transferred to the heating medium if the interior temperature lies below a predefined (lower) interior temperature threshold value, which may for example be set by the air-conditioning system.

According to one embodiment, the control unit is adapted, during a braking process of the vehicle, to drive the brake in order to brake the vehicle by actuating the brake when the battery temperature is less than the predefined battery temperature threshold value and/or the interior temperature is less than the predefined interior temperature threshold value.

The control unit is in this case further adapted to drive the cooling medium pump during the braking process in such a way that it delivers the cooling medium in the cooling medium circuit in order to dissipate the heat from the brake and/or the component of the electric drive motor of the vehicle and/or the transmission of the vehicle in an improved way, and to drive the at least one heating medium pump in such a way that it delivers the heating medium during the braking process in order to ensure transfer of the heat from the cooling medium to the heating medium.

In this way, in one embodiment, the heat generated in the brake during the braking process is dissipated and used to heat the battery and/or the interior.

According to one embodiment, the electric drive motor is operated, in a manner which is set by the control unit, in an electric motor mode in which the vehicle is being driven or the electric drive motor is idling and in a generator mode in which energy is recuperated and fed back into the battery, and the control unit is adapted, during the braking process of the vehicle, to drive the brake in order to brake the vehicle by actuating the brake and to set the electric motor mode of the electric drive motor when the battery temperature is less than the predefined (lower) battery temperature threshold value and/or the interior temperature is less than the predefined (lower) interior temperature threshold value.

In this way, for example in the event of a cold start of the vehicle, when the battery temperature and/or the interior temperature is low, in one embodiment, substantially all of the energy to be expended for the braking process by the vehicle is used to heat the battery and/or the interior.

According to one embodiment, the at least one temperature recording unit is further adapted to record a heating medium temperature of the heating medium, and the control unit is adapted to ascertain a heating power required for heating the battery and/or the interior of the vehicle, to record a position of an accelerator pedal of the vehicle, to determine a torque requirement at the electric drive motor with the aid of the position of the accelerator pedal, to drive the brake in such a way that it carries out a braking process with a predefined braking torque calculated on the basis of the required heating power, and to drive the electric drive motor in such a way that it generates a torque which is based on the torque requirement and the braking torque when the heating medium temperature is less than a predefined heating medium temperature threshold value.

The braking torque calculated on the basis of the required heating power may in this case be calculated as a function of a current rotational speed of a wheel of the vehicle, and the calculated braking torque may be divided by the gear ratio of the transmission and added to the torque requirement of the driver, which is determined with the aid of the position of the accelerator, in order to obtain the torque that needs to be generated by the electric drive motor. If the vehicle has a plurality of the brakes, such as multiple-disk brakes, the calculated braking torque may be divided by the number of brakes and the result may be produced in each of the brakes. If, for example, one brake is provided on a wheel on the left side of the vehicle and one brake is provided on a wheel on the right side of the vehicle, one half of the calculated braking torque is produced in each of the two brakes.

Furthermore, the control unit may in this case be adapted to drive the electric drive motor in such a way that it generates a torque that is equal to the sum of the torque requirement and the braking torque when the heating medium temperature is less than a predefined heating medium temperature threshold value.

In this way, in one embodiment, even in the case in which the vehicle, or its speed, is not being braked, by the active braking with the brake heat is dissipated from it and used to heat the battery and/or the interior.

According to one embodiment, the control unit is adapted to ascertain a current braking power of the brake and to set a delivery amount of the cooling medium through the cooling medium pump as a function of the current braking power.

In this way, in one embodiment, for example by increasing the delivery amount in the event of an increased braking power, the thermal dissipation by the cooling medium may be improved and the brake may simultaneously be protected against overheating.

According to one embodiment, the thermal management system further has an input temperature sensor, which is adapted to record an input temperature of the cooling medium upstream of the brake, and an output temperature sensor, which is adapted to record an output temperature of the cooling medium downstream of the brake, the control unit being adapted, if a difference between the output temperature and the input temperature exceeds a predefined differential temperature threshold value, to set the delivery amount of the cooling medium through the cooling medium pump as a function of the current braking power and a difference between the difference between the output temperature and the input temperature and the predefined differential temperature threshold value.

In this way, in one embodiment, the delivery amount of the cooling medium may be increased if the difference between the output temperature and the input temperature exceeds the predefined differential temperature threshold value, in order to prevent overheating of the brake.

According to one embodiment, the thermal management system further has a further heat exchanger for releasing heat to an environment of the vehicle, in which case an amount of heating medium delivered to the further heat exchanger may be set by the at least one manifold valve, and the control unit is adapted, when the heating medium temperature is greater than the predefined heating medium temperature threshold value, to drive the at least one manifold valve in such a way that the heating medium is delivered to the further heat exchanger and to set the generator mode of the electric drive motor during the braking process.

In this way, in one embodiment, for example in a case in which the battery and/or the interior do not need to be heated, the heat generated during the braking process in the brake may be released via the further heat exchanger to the environment of the vehicle.

Furthermore, by setting the generator mode of the electric drive motor during the braking process, it is possible that the brake does not need to be actuated, or needs to be actuated only to a small extent, for the braking process since the braking effect of the generator mode, or the braking torque which is induced by the generator mode, is sufficient therefor or is added to the braking effect of the brake, and a further increase of the heating medium temperature is therefore substantially avoided while at the same time energy is recovered by the generator mode.

According to one embodiment, the control unit is adapted to drive the brake in order to brake the vehicle additionally by actuating the brake when the heating medium temperature is greater than the predefined heating medium temperature threshold value and a braking torque required for the braking process is greater than a braking torque which may be generated by the generator mode during the braking process.

In this way, in one embodiment, the braking process may be carried out with the necessary braking torque even if the braking torque required for the braking process cannot be generated, or cannot permanently be generated, by the generator mode, for example in the event of prolonged downhill driving of the vehicle, since the electric drive motor would thereby be overheated.

According to one embodiment, the thermal management system further has a cooling medium circuit manifold valve, by which a ratio between a cooling medium amount used for cooling the brake and a cooling medium amount used for cooling the component and/or the transmission may be set, and at least one temperature recording device for recording a temperature of the component and/or a temperature of the transmission, the control unit being adapted to set the delivery amount of cooling medium through the cooling medium pump additionally as a function of the temperature of the component and/or the temperature of the transmission, and to set the ratio between the cooling medium amount used for cooling the brake and the cooling medium amount used for cooling the component and/or the transmission on the basis of the temperature of the component and/or the temperature of the transmission and the difference between the difference between the output temperature and the input temperature and the predefined differential temperature threshold value.

In this way, in one embodiment, the cooling medium amounts/flow rates used for cooling the brake and for cooling the component and/or for cooling the transmission may be set individually according to requirements.

According to one embodiment, the thermal management system further has:

a cooling circuit with an evaporator for cooling the interior of the vehicle, a condenser, and a compressor for delivering a further heating medium in the cooling circuit, and a further heat transfer device for exchanging heat between the heating medium in the heating medium circuit and the further heating medium in the cooling circuit.

In this case, the cooling circuit may be formed by the cooling circuit of the air-conditioning system of the vehicle, it being possible to transfer heat from the battery via the heating medium and the further heat transfer device to the further heating medium in order to cool the battery if the battery temperature is greater than a predefined upper battery threshold value.

According to another aspect of the invention, a vehicle, such as a motor vehicle, has a thermal management system as described above.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further advantages and features may be found in the exemplary embodiments. In this regard, sometimes schematically.

DETAILED DESCRIPTION OF THE PREFERRED EMBODIMENTS

The following description of the preferred embodiment(s) is merely exemplary in nature and is in no way intended to limit the invention, its application, or uses.

Figure 1:
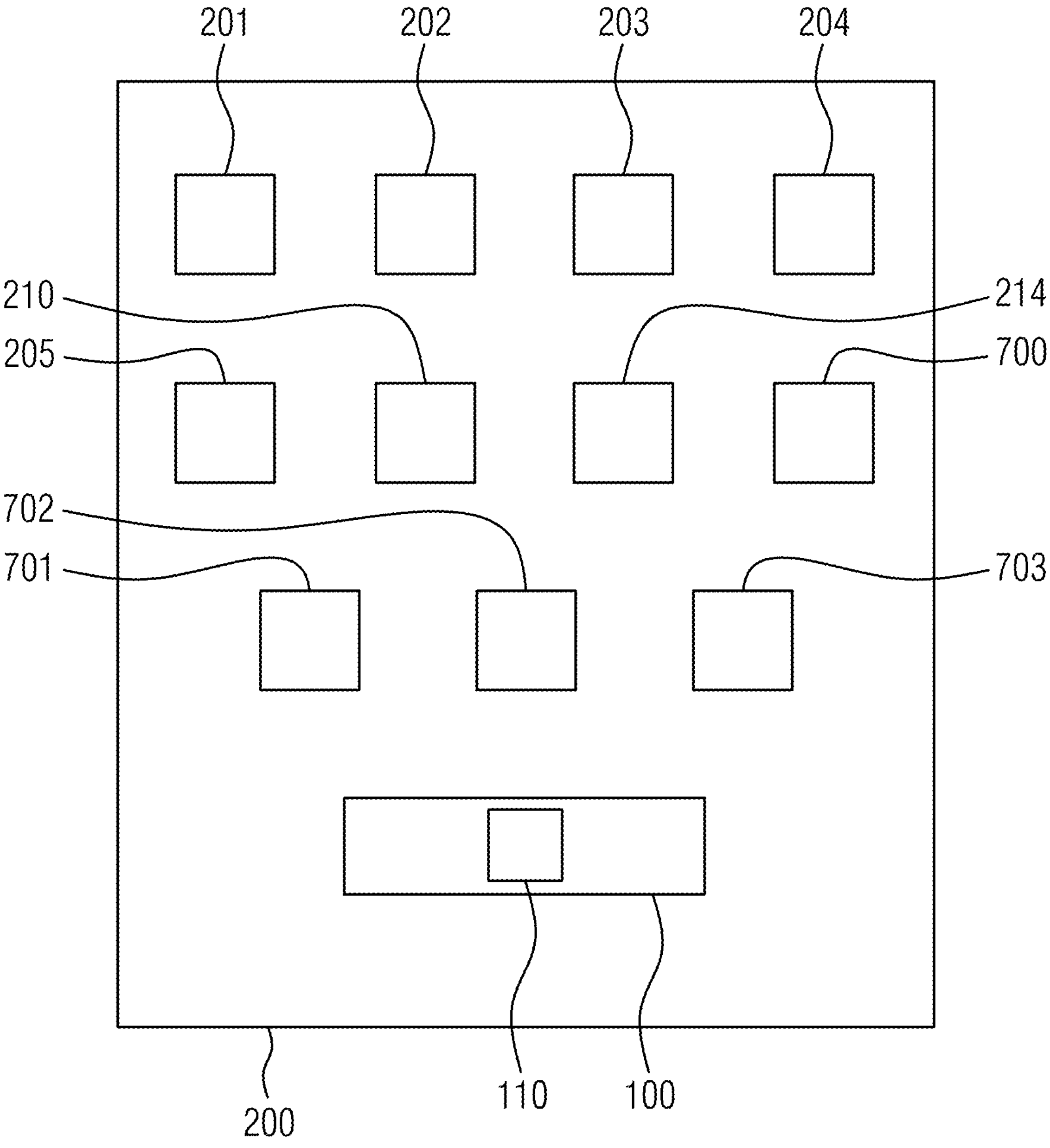
FIG. 1 shows a vehicle with a thermal management system according to one embodiment of the invention.
Figure 2:
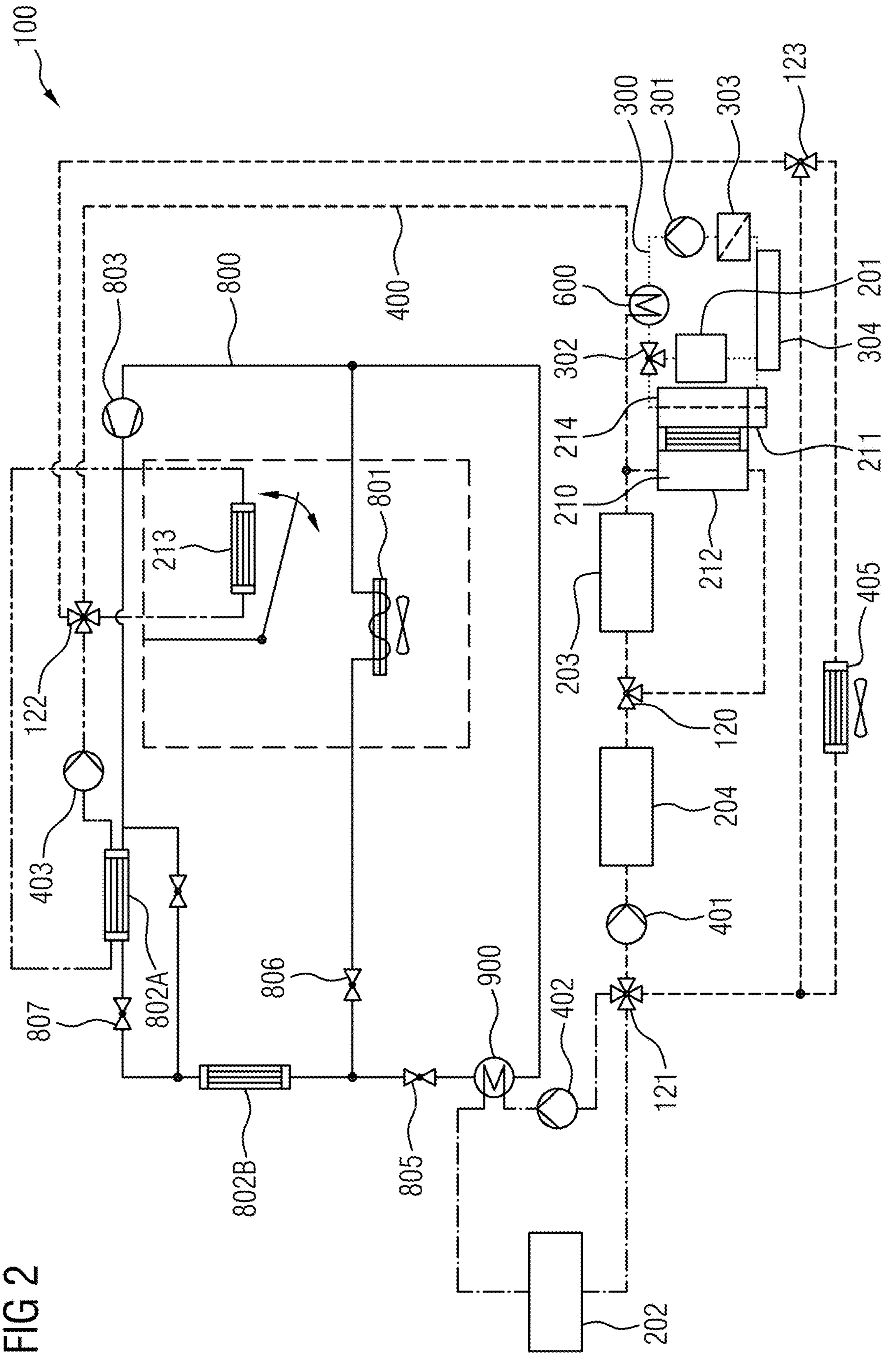
FIG. 2 shows a thermal management system according to one embodiment of the invention.

FIG. 1 shows a vehicle with a thermal management system according to one embodiment of the invention, and FIG. 2 shows details of the thermal management system shown in FIG. 1.

The vehicle 200, such as an electric, hybrid or hydrogen vehicle, has a thermal management system 100 with a control unit 110, a brake 201, for instance a multiple-disk brake, for braking the vehicle 200, a battery 202, power electronics 203, such as an inverter, a charging device 204 for charging the battery 202, an accelerator pedal 205, an electric drive motor 210 with a component 211, such as a rotor, and another component 212, such as a stator, a transmission 214, such as a reduction gearbox, for coupling the rotor 211 to a drive shaft (not shown) of the vehicle 200, which is coupled to the wheels of the vehicle 200, at least one temperature recording unit 700, an input temperature sensor 701, an output temperature sensor 702, and at least one temperature recording device 703.

The thermal management system 100 has a cooling medium circuit 300 with a cooling medium pump 301 for delivering a cooling medium, such as oil, in the cooling medium circuit 300 for cooling and/or lubricating the brake 201 and/or the component 211 of the electric drive motor 210 of the vehicle 200 and/or the transmission 214 of the vehicle 200, a filter 303, such as an oil filter, for filtering the cooling medium and a sump 304, such as an oil sump, for the cooling medium.

The thermal management system 100 furthermore has a heating medium circuit 400 with at least one heating medium pump 401, 402, 403 for delivering a heating medium, for instance water, in the heating medium circuit 400 for cooling and/or heating the battery 202 and/or the power electronics 203 and/or the charging device 204 and/or the other component 212 of the electric drive motor 210 of the vehicle 200 and/or an interior of the vehicle 200, for instance by a heat exchanger 213, and a heat transfer device 600 for exchanging heat between the cooling medium in the cooling medium circuit 300 and the heating medium in the heating medium circuit 400.

The at least one temperature recording unit 700 is in this case adapted to record an interior temperature of the interior of the vehicle 200 and/or a battery temperature of the battery 202, in which case an amount of heating medium delivered to the battery 202 is set by a manifold valve 121, an amount of heating medium delivered to the power electronics 203 and an amount of heating medium delivered to the other component 212 of the electric drive motor 210 of the vehicle 200 is set by a manifold valve 120, and an amount of heating medium delivered to the heat exchanger 213 is set by a manifold valve 122.

The control unit 110 is adapted to drive the manifold valve 121 in such a way that the heating medium is delivered to the battery 202 when the battery temperature is less than a predefined battery temperature threshold value, and/or to drive the manifold valve 122 in such a way that the heating medium is delivered to the heat exchanger 213 when the interior temperature is less than a predefined interior temperature threshold value.

The control unit 110 is in this case adapted, during a braking process of the vehicle 200, to drive the brake 201 in order to brake the vehicle 200 by actuating the brake 201 when the battery temperature is less than the predefined battery temperature threshold value and/or the interior temperature is less than the predefined interior temperature threshold value.

The electric drive motor 210 may be operated, in a manner which is set by the control unit 110, in an electric motor mode in which the vehicle 200 is being driven or the electric drive motor 210 is idling and in a generator mode in which energy is recovered by recuperation and the recuperated energy is fed back into the battery 202. The control unit 110 is in this case adapted, during the braking process of the vehicle 200, to drive the brake 201 in order to brake the vehicle 200 by actuating the brake 201 and to set the electric motor mode of the electric drive motor 210 when the battery temperature is less than the predefined battery temperature threshold value and/or the interior temperature is less than the predefined interior temperature threshold value.

The at least one temperature recording unit 700 is further adapted to record a heating medium temperature of the heating medium, the control unit 110 being adapted to ascertain a heating power required for heating the battery 202 and/or the interior of the vehicle 200, to record a position of the accelerator pedal 205 of the vehicle 200, to determine a torque requirement at the electric drive motor 210, which is desired by the driver, with the aid of the position of the accelerator pedal 205, to drive the brake 201 in such a way that it carries out a braking process with a predefined braking torque calculated on the basis of the required heating power, and to drive the electric drive motor 210 in such a way that it generates a torque which is based on the torque requirement and the braking torque when the heating medium temperature is less than a predefined heating medium temperature threshold value.

The braking torque calculated on the basis of the required heating power may in this case be calculated as a function of a current rotational speed of a wheel of the vehicle 200, and the calculated braking torque may be divided by the gear ratio of the transmission 214 and added to the torque requirement of the driver, which is determined with the aid of the position of the accelerator 205, in order to obtain the torque that needs to be generated by the electric drive motor 210. If the vehicle 200 has a plurality of the brakes 201, such as multiple-disk brakes, the calculated braking torque may be divided by the number of brakes 201 and the result may be produced in each of the brakes 201. If, for example, one brake 201 is provided on a wheel on the left side of the vehicle 200 and one brake is provided on a wheel on the right side of the vehicle 200, one half of the calculated braking torque is produced in each of the two brakes 201.

The control unit 110 is adapted to ascertain a current braking power of the brake 201 and to set a delivery amount of the cooling medium through the cooling medium pump 301 as a function of the current braking power.

The input temperature sensor 701 is adapted to record an input temperature of the cooling medium upstream of the brake 201, and the output temperature sensor 702 is adapted to record an output temperature of the cooling medium downstream of the brake 201. The control unit 110 is adapted, if a difference between the output temperature and the input temperature exceeds a predefined differential temperature threshold value, to set the delivery amount of the cooling medium through the cooling medium pump 301 as a function of the current braking power and a difference between the difference between the output temperature and the input temperature and the predefined differential temperature threshold value.

The thermal management system 100 further has a further heat exchanger 405, such as a radiator, for releasing heat to an environment of the vehicle 200, in which case an amount of heating medium delivered to the further heat exchanger 405 is set by the manifold valve 123. The control unit 110 is in this case adapted, when the heating medium temperature is greater than the predefined heating medium temperature threshold value, to drive the manifold valve 123 in such a way that the heating medium is delivered to the further heat exchanger 405 and to set the generator mode of the electric drive motor 210 during the braking process.

The control unit 110 is adapted to drive the brake 201 in order to brake the vehicle 200 additionally by actuating the brake 201, besides the braking by operating the electric drive motor 210 in the generator mode, when the heating medium temperature is greater than the predefined heating medium temperature threshold value and a braking torque required for the braking process is greater than a braking torque which may be generated by the generator mode during the braking process, or is a braking torque that would lead to overheating of the electric drive motor 210 during permanent generation by the generator mode.

The thermal management system 100 further has a cooling medium circuit manifold valve 302, by which a ratio between a cooling medium amount used for cooling the brake 201 and a cooling medium amount used for cooling the component 211 and/or the transmission 214 is set, the at least one temperature recording device 703 being adapted to record a temperature of the component 211 and/or a temperature of the transmission 214.

The control unit 110 is in this case adapted to set the delivery amount of cooling medium through the cooling medium pump 301 additionally as a function of the temperature of the component 211 and/or the temperature of the transmission 214, and to set the ratio between the cooling medium amount used for cooling the brake 201 and the cooling medium amount used for cooling the component 211 and/or the transmission 214 on the basis of the temperature of the component 211 and/or the temperature of the transmission 214 and the difference between the difference between the output temperature and the input temperature and the predefined differential temperature threshold value.

The thermal management system 100 further has a cooling circuit 800, such as an air-conditioning system of the vehicle 200, with an evaporator 801 for cooling the interior of the vehicle 200, condensers 802A, 802B, expansion valves 805, 806 and 807, and a compressor 803 for delivering a further heating medium in the cooling circuit 800, and a further heat transfer device 900 for exchanging heat between the heating medium in the heating medium circuit 400 and the further heating medium in the cooling circuit 800.

In this case, as illustrated in FIG. 2, the heating medium of the heating medium circuit 400 may be delivered by the heating medium pump 403 likewise to the condenser 802A.

The description of the invention is merely exemplary in nature and, thus, variations that do not depart from the gist of the invention are intended to be within the scope of the invention. Such variations are not to be regarded as a departure from the spirit and scope of the invention.

LIST OF REFERENCE SIGNS

100 thermal management system
110 control unit
120, 121, 122 manifold valve
200 vehicle
201 brake
202 battery
203 power electronics
204 charging device
205 accelerator pedal
210 electric drive motor
211 one component of the electric drive motor
212 other component of the electric drive motor
213 heat exchanger
214 transmission
300 cooling medium circuit
301 cooling medium pump
302 cooling medium circuit manifold valve
303 oil filter
304 oil sump
400 heating medium circuit
401, 402, 403 heating medium pump
405 further heat exchanger
600 heat transfer device
700 temperature recording unit
701 input temperature sensor
702 output temperature sensor
703 temperature recording device
800 cooling circuit
801 evaporator
802A, 802B condenser
803 compressor

804, 805, 806, 807 expansion valve
900 further heat transfer device

What is claimed is:

1. A thermal management system for a vehicle, having:
a cooling medium circuit, further comprising:
a cooling medium pump for delivering a cooling medium in the cooling medium circuit for cooling a brake, and/or a component of an electric drive motor of the vehicle and/or a transmission, of the vehicle; and
a heating medium circuit, further comprising:
at least one heating medium pump for delivering a heating medium in the heating medium circuit for cooling and/or heating a battery and/or power electronics and/or a charging device and/or another component of the electric drive motor of the vehicle and/or for heating an interior of the vehicle, by a heat exchanger;
a heat transfer device for exchanging heat between the cooling medium in the cooling medium circuit and the heating medium in the heating medium circuit;
at least one temperature recording unit, which is adapted to record an interior temperature of the interior of the vehicle and/or a battery temperature of the battery;
at least one manifold valve, by which an amount of heating medium delivered to the battery and/or an amount of heating medium delivered to the power electronics and/or an amount of heating medium delivered to the charging device and/or an amount of heating medium delivered to the other component of the electric drive motor of the vehicle and/or an amount of heating medium delivered to the heat exchanger is set; and
a control unit, which is adapted to drive the at least one manifold valve in such a way that the heating medium is delivered to the battery when the battery temperature is less than a predefined battery temperature threshold value, and/or to drive the at least one manifold valve in such a way that the heating medium is delivered to the heat exchanger when the interior temperature is less than a predefined interior temperature threshold value;
wherein the control unit is adapted, during a braking process of the vehicle, to drive the brake in order to brake the vehicle by actuating the brake when the battery temperature is less than the predefined battery temperature threshold value and/or the interior temperature is less than the predefined interior temperature threshold value.

2. The thermal management system of claim 1, wherein the electric drive motor is operated, in a manner which is set by the control unit, in an electric motor mode and in a generator mode, and the control unit is adapted, during the braking process of the vehicle, to drive the brake in order to brake the vehicle by actuating the brake and to set the electric motor mode of the electric drive motor when the battery temperature is less than the predefined battery temperature threshold value and/or the interior temperature is less than the predefined interior temperature threshold value.

3. The thermal management system of claim 2, wherein the at least one temperature recording unit is further adapted to record a heating medium temperature of the heating medium, and the control unit is adapted to ascertain a heating power required for heating the battery and/or the interior of the vehicle, to record a position of an accelerator pedal of the vehicle, to determine a torque requirement at the electric drive motor with the aid of the position of the accelerator pedal, to drive the brake in such a way that it carries out a braking process with a predefined braking torque calculated on the basis of the required heating power, and to drive the electric drive motor in such a way that it generates a torque which is based on the torque requirement and the braking torque when the heating medium temperature is less than a predefined heating medium temperature threshold value.

4. The thermal management system of claim 3, wherein the control unit ascertains a current braking power of the brake and sets a delivery amount of the cooling medium through the cooling medium pump as a function of the current braking power.

5. The thermal management system of claim 4, further comprising:
an input temperature sensor, which is adapted to record an input temperature of the cooling medium upstream of the brake; and
an output temperature sensor, which is adapted to record an output temperature of the cooling medium downstream of the brake;
wherein the control unit is adapted, if a difference between the output temperature and the input temperature exceeds a predefined differential temperature threshold value, to set the delivery amount of the cooling medium through the cooling medium pump as a function of the current braking power and a difference between the difference between the output temperature and the input temperature and the predefined differential temperature threshold value.

6. The thermal management system of claim 4, further comprising:
a further heat exchanger for releasing heat to an environment of the vehicle;
wherein an amount of heating medium delivered to the further heat exchanger is set by the at least one manifold valve, and the control unit is adapted, when the heating medium temperature is greater than the predefined heating medium temperature threshold value, to drive the at least one manifold valve in such a way that the heating medium is delivered to the further heat exchanger and to set the generator mode of the electric drive motor during the braking process.

7. The thermal management system of claim 6, wherein the control unit is adapted to drive the brake in order to brake the vehicle additionally by actuating the brake when the heating medium temperature is greater than the predefined heating medium temperature threshold value and a braking torque required for the braking process is greater than a braking torque which is generated by the generator mode during the braking process.

8. The thermal management system of one of claim 4, further comprising:
a cooling medium circuit manifold valve, by which a ratio between a cooling medium amount used for cooling the brake and a cooling medium amount used for cooling the component and/or the transmission is set; and
at least one temperature recording device for recording a temperature of the component and/or a temperature of the transmission;
wherein the control unit sets the delivery amount of cooling medium through the cooling medium pump additionally as a function of the temperature of the component and/or the temperature of the transmission, and sets the ratio between the cooling medium amount used for cooling the brake and the cooling medium amount used for cooling the component and/or the transmission on the basis of the temperature of the component and/or the temperature of the transmission and the difference between the difference between the output temperature and the input temperature and the predefined differential temperature threshold value.

9. The thermal management system of claim 1, further comprising:

a cooling circuit, further comprising:

an evaporator for cooling the interior of the vehicle;

a condenser;

a compressor for delivering a further heating medium in the cooling circuit; and a further heat transfer device for exchanging heat between the heating medium in the heating medium circuit and the further heating medium in the cooling circuit.

10. A vehicle having a thermal management system of claim 1.

* * * * *